(12) United States Patent
Huyser et al.

(10) Patent No.: US 8,513,313 B2
(45) Date of Patent: *Aug. 20, 2013

(54) HYDROCARBON SYNTHESIS PROCESS

(75) Inventors: Johannes Jacobus Huyser, Parys (ZA); Matthys Josephus Janse Van Vuuren, Sasolburg (ZA)

(73) Assignee: Sasol Technology (Pty) Limited, Johannesburg (ZA)

( * ) Notice: Subject to any disclaimer, the term of this patent is extended or adjusted under 35 U.S.C. 154(b) by 335 days.

This patent is subject to a terminal disclaimer.

(21) Appl. No.: 12/672,985

(22) PCT Filed: Aug. 5, 2008

(86) PCT No.: PCT/IB2008/053137
§ 371 (c)(1),
(2), (4) Date: Jul. 19, 2011

(87) PCT Pub. No.: WO2009/022263
PCT Pub. Date: Feb. 19, 2009

(65) Prior Publication Data
US 2011/0269853 A1 Nov. 3, 2011

(30) Foreign Application Priority Data
Aug. 10, 2007 (ZA) .................................. 2007/06647
Aug. 10, 2007 (ZA) .................................. 2007/06948

(51) Int. Cl.
*C07C 27/00* (2006.01)
*B01J 20/34* (2006.01)

(52) U.S. Cl.
USPC .............................. 518/700; 518/715; 502/34

(58) Field of Classification Search
USPC ................................... 518/700, 715; 502/34
See application file for complete search history.

(56) References Cited

PUBLICATIONS

Shin et al., JP abstract 61090739, 1986.*
International+ Search Report (PCT/IB2008/053137) dated May 12, 2009.
International Preliminary Report on Patentability (PCT/IB2008/053137) dated Nov. 4, 2009.
Robert J. O'Brien et al., "Activity and selectivity of precipitated iron Fischer-Tropsch catalysts," Catalysis Today, vol. 36, No. 3, Jun. 6, 1997, pp. 325-334, XP-002517249.
Robert J. O'Brien et al., "Activation Study of Precipitated Iron Fischer-Tropsch Catalysts," Energy & Fuels, vol. 10, Jul. 18, 1996, pp. 921-926, XP-002517250.
Dragomir B. Burkur et al., "Activation Studies with a Precipitated Iron Catalyst for Fischer-Tropsch Synthesis," Journal of Catalysis, vol. 155, Sep. 1, 1995, pp. 366-375, XP-002517251.
Dragomir B. Burkur et al., "Pretreatment effect studies with a precipitated iron Fischer-Tropsch catalyst in a slurry reactor," Applied Catalysis A: General, vol. 186, Oct. 4, 1999), pp. 255-275 XP 002517252.
Bo-Tao Teng et al., "Oxygenate kinetics in Fischer-Tropsch synthesis over an industrial Fe-Mn catalyst," Fuel, vol. 84, Jan. 25, 2005, pp. 791-800, XP 002517253.

* cited by examiner

*Primary Examiner* — Jafar Parsa
(74) *Attorney, Agent, or Firm* — Finnegan Henderson Farabow Garrett & Dunner LLP

(57) ABSTRACT

This invention relates to a hydrocarbon synthesis process. More particularly, but not exclusively, this invention relates to a Fischer Tropsch Process employing an activated catalyst and to the use of such an activated catalyst, wherein the Fischer Tropsch Process conditions favor the attainment of a low acid selectivity. More particularly the invention relates to a three-phase low temperature Fischer Tropsch (LTFT) process wherein a feed of $H_2$ and CO are converted to hydrocarbons and possible oxygenates thereof by contacting the $H_2$ and CO in the presence of an iron-based Fischer Tropsch catalyst in a reaction zone, wherein the molar ratio of $H_2$:CO in the feed is from 0.5 and less than 1.0 and wherein the iron-based Fischer Tropsch catalyst is activated according to the steps of: (a) providing an iron-based catalyst including iron in a positive oxidation state; and (b) contacting the iron-based catalyst in a reactor with a reducing gas selected from CO and a combination of $H_2$ and CO; at a reduction temperature of at least 245° C. and below 280° C.; at a reducing gas pressure of above 0.5 MPa and not more than 2.2 MPa; and at a GHSV of total reducing gas fed to the reactor of at least 6000 ml(N)/g cat/h, thereby reducing the iron that is in a positive oxidation step in the catalyst.

12 Claims, No Drawings

HYDROCARBON SYNTHESIS PROCESS

FIELD OF THE INVENTION

This invention relates to a hydrocarbon synthesis process. More particularly, but not exclusively, this invention relates to a Fischer Tropsch Process employing an activated catalyst and to the use of such an activated catalyst, wherein the Fischer Tropsch Process conditions favour the attainment of a low acid selectivity.

BACKGROUND TO THE INVENTION

A Fischer-Tropsch (FT) process comprises the hydrogenation of CO in the presence of a catalyst based on metals, such as Fe, Co and Ru. The products formed from this reaction are water, gaseous, liquid and waxy hydrocarbons which may be saturated or unsaturated. Oxygenates of the hydrocarbons such as alcohols, acids, ketones and aldehydes are also formed.

A heterogeneous Fisher-Tropsch process may be conveniently categorised as either a high temperature Fischer-Tropsch (HTFT) process or a low temperature Fischer-Tropsch (LTFT) process. The HTFT process can be described as a two phase Fischer-Tropsch process. It is usually carried out at a temperature from 250° C. to 400° C. and the catalyst employed is usually an iron-based catalyst. Generally, the process is commercially carried out in a fluidised bed reactor. It is well-known that HTFT synthesis is preferred for the production of high value linear alkenes, and iron catalysts, operating at high temperatures in fluidised bed reactors, remain the catalysts of choice.

The LTFT process can be described as a three phase Fischer-Tropsch process. It is usually carried out at a temperature from 220° C. to 310° C. and the catalyst employed is usually either a Co-based catalyst or a Fe-based catalyst. The conditions under which this process is carried out, results in the products being in a liquid and possibly also in a gas phase in the reactor. Therefore this process can be described as a three phase process, where the reactants are in the gas phase, at least some of the products are in the liquid phase and the catalyst is in a solid phase in the reaction zone. Generally this process is commercially carried out in a fixed bed reactor or a slurry bed reactor.

LTFT synthesis using Fe-based catalysts is usually the synthesis procedure of choice for the conversion of coal-derived synthesis gas ($H_2$ and CO) to hydrocarbon products. It is also well known in the art that Fe-based catalysts have hydrogenation and water—gas—shift (WGS) activities, the WGS reaction (formula i below) occurring simultaneously with the production of hydrocarbons during hydrocarbon synthesis (formula ii below).

$$CO + H_2O \rightarrow CO_2 + H_2 \quad \text{i}$$

$$nCO + (2n+1)H_2 \rightarrow C_nH(2n+2) + nH_2O \quad \text{ii}$$

For commercial reasons it is desirous to operate an FT hydrocarbon synthesis process in the most economical way, taking into account the effect that the WGS reaction has on the hydrocarbon synthesis reaction and vice versa. It is well known in the art that since the water that is formed during the hydrocarbon synthesis is used as a reagent in the WGS reaction and since the WGS reaction consumes CO and produces hydrogen, the ratio of hydrogen to CO in the feed that is used for the hydrocarbon synthesis (syngas) may be higher or lower than the usage ratio $$\left( \text{i.e.} \frac{\Delta H_2}{\Delta CO} \right)$$

of hydrogen and CO used in the hydrocarbon synthesis reaction.

Accordingly it is known to operate an FT hydrocarbon synthesis process with a syngas having a low hydrogen to CO ratio, typically between 0.5 and 1.3, a high conversion rate and a low water partial pressure in the reactor.

The economically favourable conditions discussed above however impact on the activity and stability of the Iron-based catalyst used in the FT hydrocarbon synthesis process.

Although much research has been undertaken and reported in the art in an attempt to find Iron-based catalysts that are able to perform under the rigours of the above mentioned conditions, the effect of the combination of the manner in which the Iron-based catalyst is activated and the selected hydrocarbon synthesis conditions under which the catalyst is used with a low carboxylic acid selectivity, on the stability and activity of the catalyst and on the hydrocarbon production of the FT hydrocarbon synthesis process have not been the subject of intense study.

Catalysis Today 36 (1997) 325; Canadian J. Chem. Eng., 74 (1996) 399-404; Applied Catalysis. A: General 186 (1999) 255-275; Journal of Catalysis 155, (1995) 366-375 and Energy and Fuels, 10 (1996) 921-926 describe different catalyst activation procedures and their influence on FT synthesis. The influence of different reducing gasses ($H_2$, CO, or a combination of $H_2$ and CO) used during activation is disclosed. Reduction at different pressures and temperatures are also disclosed. However, none of the documents disclose the activation conditions of the present invention.

It will also be noted from the art that little emphasis is placed on the effect of the combination of the manner in which the Iron-based catalyst is activated and the selected hydrocarbon synthesis conditions under which the catalyst is used on the production of oxygenates of hydrocarbon products and more particularly with respect to the production of carboxylic acid, which carboxylic acid has the effect of not only weakening the mechanical integrity of the catalyst but also eroding the equipment used to run the FT synthesis (B-T Teng, C-H Zang, J Yang, D-B Cao. J Chang, H-W Xiang and Y-W Li; Fuel, 84, (2005) 791-800).

The Applicants have now found that the combination of activating the Iron-based catalyst under the conditions set out herein and conducting the FT synthesis under favourable conditions to take into account the WGS reaction allows for an FT synthesis process wherein the hydrocarbon production rate is acceptable with a low production of carboxylic acid and the catalyst activated under the below mentioned conditions has good catalyst life time and activity for a process run under the particular conditions discussed herein.

SUMMARY OF THE INVENTION

According to a first aspect of the invention there is provided a three-phase low temperature Fischer Tropsch (LTFT) process wherein a feed of $H_2$ and CO are converted to hydrocarbons and possible oxygenates thereof by contacting the $H_2$ and CO in the presence of an iron-based Fischer Tropsch catalyst in a reaction zone, wherein the molar ratio of $H_2$:CO in the feed is from 0.5 and less than 1.0 and wherein the iron-based Fischer Tropsch catalyst is activated according to the steps of:

(a) providing an iron-based catalyst including iron in a positive oxidation state; and (b) contacting the iron-based catalyst in a reactor with a reducing gas selected from CO and a combination of $H_2$ and CO; at a reduction temperature of at least 245° C. and below 280° C.; at a reducing gas pressure of above 0.5 MPa and not more than 2.2 MPa; and at a GHSV of total reducing gas fed to the reactor of at least 6000 ml(N)/g cat/h, thereby reducing the iron that is in a positive oxidation state in the catalyst.

It will be appreciated that it is the combination of the conditions under which the LTFT process is conducted and the conditions for the activation of the iron based catalyst which form the basis of the invention.

Preferably less than $1.0\times10^{-3}$ mole of COOH per mole of CO that is converted to FT products, i.e. hydrocarbons and possible oxygenates thereof, is produced.

Low Temperature Fischer Tropsch Process

The LTFT process is a three-phase LTFT process, wherein, under reaction conditions, the reactants are in a gas phase, at least some of the products are in a liquid phase and the catalyst is in a solid phase.

Preferably the reactor in which the LTFT process is carried out is a slurry bed or fixed bed reactor. Preferably it is a slurry bed reactor.

As a result of the WGS reaction, it is preferable for the reaction conditions of the LIFT process to be such that the usage ratio is substantially the same as the ratio of $H_2$:CO in the syngas fed to the reactor.

It will be appreciated that in the presence of an iron based catalyst, and as a result of the WGS reaction, the $H_2$:CO molar ratio may be a low ratio, typically as herein mentioned between 0.5 and less than 1.0, preferably from 0.60 to 0.85.

The process may be carried out at a temperature of between 150 and 300° C., preferably between 200 and 290° C. and more preferably between 245 and 280° C.

In an embodiment of the invention, the process may be carried out at a pressure of between atmospheric pressure and 3.5 MPa, preferably between 1 and 3 MPa and more preferably between 1.2 and 2.7 MPa.

It is envisaged that the use of, inter alia, higher temperatures and lower pressures, than would ordinarily be used in an LIFT process, together with the activation of the catalyst as herein described, provides for a favorable LTFT process.

The GHSV of the feed of $H_2$ and CO for the synthesis of hydrocarbons and possible oxygenates thereof is between 100 and 30 000 ml(n)/g cat/h, preferably between 500 and 10 000 ml(n)/g cat/h and more preferably between 1000 to 8000 ml(n)/g cat/h.

It is envisaged by the Applicants that a process carried out as described herein above with an iron-based catalyst activated as set out herein shall result in a process for the synthesis of hydrocarbons wherein the production of acid is less than $1.0\times10^{-3}$ mole of COOH per mole of CO which is converted to FT products.

The tail gas (i.e. the gas that exits the FT reactor) may be recycled into the feed of $H_2$ and CO. Preferably the molar ratio of $H_2$:CO in the tail gas is substantially the same as the molar ratio of $H_2$:CO in the feed.

Activation of the Iron-Based LTFT Catalyst

The catalyst may comprise a low temperature Fischer-Tropsch catalyst, that is a catalyst suitable to be used in a three-phase FT process, preferably in a slurry bed reactor.

The catalyst may be activated in situ or may be activated separate and apart from the FT process.

The iron catalyst may include one or more promotors such as a promotor that enhances reduction and/or a structural promotor. The one or more promotors may be selected from the group consisting of a source of alkali metal, a source of an alkaline earth metal, a source of Cu and a source of Si.

The iron catalyst may include a promotor in the form of a source of an alkali metal and/or an alkaline earth metal. Preferably the promotor is in the form of a source of an alkali metal and preferably the alkali metal is K, Na or Cs, preferably it is K.

Preferably the source of alkali metal is an alkali metal oxide such as $Na_2O$, $K_2O$ or $Cs_2O$, preferably it is $K_2O$. The alkali metal may be present at a concentration of 0.1 to 8 g alkali metal oxide/100 gFe, preferably 4.3 to 5 g alkali metal oxide/100 gFe.

The iron catalyst may also include a transition metal promotor and preferably the transition metal is Cu. It is believed that Cu enhances reduction of an iron based catalyst. The Cu may be present at a concentration of 0.5 to 8 g Cu/100 gFe, preferably from 3 to 6 g Cu/100 gFe.

The iron catalyst may also include a structural promotor, and preferably it is $SiO_2$. The $SiO_2$ may be present at a concentration of 7 to 45 g $SiO_2$/100 gFe, preferably from 22 to 26 g $SiO_2$/100 gFe.

The catalyst may be prepared by any suitable procedure such as precipitation.

Preferably at least some of the iron is present as $Fe^{2+}$ and/or $Fe^{3+}$ prior to reduction and preferably at least some of the iron is reduced to Fe(0).

Preferably not more than 15%, preferably not more than 10%, preferably 0% by mass of the iron in the catalyst is in Fe(0) form prior to reduction according to the present invention.

The catalyst may be provided in a fixed bed in the reactor, but preferably the catalyst is provided in a slurry bed in the reactor. The catalyst may be mixed with a suitable carrier such as a wax to prepare a slurry bed in a slurry bed reactor.

Reactor

Any suitable reactor may be used to reduce the iron catalyst. Preferably the reactor is a reactor suitable for carrying out LTFT synthesis. Preferably the reactor is fixed bed reactor or a slurry bed reactor. Preferably the reactor is a slurry bed reactor.

Reducing Gas

As stated above, the reducing gas comprises a gas selected from CO and a combination of $H_2$ and CO. The combination of $H_2$ and CO is also known as syngas. Preferably the reducing gas is a combination of $H_2$ and CO. The syngas may be prepared in any suitable manner and in one embodiment of the invention the syngas may be coal-derived syngas. Preferably the $H_2$:CO molar ratio is from 100:1 to 1:100, preferably from 5:1 to 1:5, preferably from 1:2 to 2:1.

The reducing gas may form part of a feed gas which includes one or more other gasses such as, for example, light hydrocarbon products of FT synthesis, or inert gasses for instance $CO_2$, argon and nitrogen.

Reduction Temperature

As stated above the temperature at which reduction of the catalyst is carried out is at least 245° C. and below 280° C., preferably below 270° C. and more preferably between 250° C. to 265° C.

Reduction Pressure

As stated above reduction of the catalyst is carried out at a reducing gas pressure above 0.5 MPa and not more than 2.2 MPa.

It will be appreciated that the reducing gas pressure is the pressure of all reducing gas in the reactor capable of reducing iron under the conditions present in the reactor, and excludes the pressure of all gas that does not reduce iron (such as $CO_2$ and argon).

Preferably the said pressure is below 2.0 MPa and above 0.5 MPa. Preferably said pressure is from 1.0 MPa to 1.8 MPa.

GHSV

As stated above the GHSV of total gas fed to the reactor is at least 6000 ml(N)/g cat/h. Preferably said GHSV is at least 7000 ml(N)/g cat/h, preferably at least 9000 ml(N)/g cat/h, preferably at least 10 000 ml(N)/g cat/h.

Reduction

Reduction time may be up to 36 hours, preferably up to 24 hours, preferably up to 16 hours.

The invention will now be described by means of the following non-limiting examples:

EXAMPLES

The iron-based catalyst used in the examples was prepared to have the specifications set out below and was prepared according to the procedure described by Frohning et al (C. D. Frohning, W. Rotting, F. Schnur, J. Falbe (Ed), "Chemierohstoffe aus kohle", Thieme, Stuttgart, 1977, p 234). It will be appreciated that the catalyst may be prepared by other know methods in the art without departing from the spirit and the scope of the invention.

| | |
|---|---|
| Fe | between 30 and 70 mass % |
| Cu | between 0.5 and 8 g/100 g of Fe |
| K$_2$O | between 0.1 and 8 g/100 g of Fe |
| SiO$_2$ | between 7 and 45 g/100 g Fe |

The slight difference under which the LTFT hydrocarbon synthesis processes are conducted in examples 1 and 2 below are to ensure that the usage ratio is similar to the H$_2$:CO feed ratio and should be obvious to the skilled person that the differences in process conditions are too small to account for the impact on acid selectivity as shown in the examples.

Example 1

10 gram of a catalyst prepared as described above was added to 350 g of commercially produced H1 wax (commercially produced by Sasol Wax South Africa (Pty) Limited) at 150° C. in a slurry reactor. The slurry reactor was closed and pressurised with an inert gas, namely Argon, to 1.35 MPa. The temperature of the reactor was increased to 255° C. and at that temperature, syngas (H$_2$:CO=1.5) was passed through the reactor at a GHSV of 10500 ml(n)/g cat/h and maintained for 16 hours. A fresh feed and tail gas GC analysis was done using a ~10% Ar flow in the feedgas as internal standard and used to calculate rates and conversions.

After this activation/reduction period the temperature was kept unchanged at 255° C. and the reactor pressure increased to 2.0 MPa. The syngas ratio of the fresh feed was changed to 0.76 (H$_2$:CO) and fed to the reactor at a GHSV of 2000 ml(N)/g cat/h. These conditions gave a comparable FT and WGS rate (FTS rate=0.4×10$^{-5}$ moleCO/g cat/s) and resulted in a usage ratio similar to the feedgas ratio $$\left(\frac{\Delta H_2}{\Delta CO} = 0.78\right).$$

This catalyst showed no loss in activity even after 7 days with a methane selectivity that stabilised at around 4%. The total acid production (oil and water fraction) was around 0.9×10$^{-3}$ (mole COOH/mole CO→FT products).

Example 2

This example shows the negative effect of not choosing the correct reduction/activation conditions for an identical catalyst as used in example 1.

10 gram of the same catalyst as example 1, was added to 350 g of commercially produced H1 wax (commercially produced by Sasol Wax South Africa (Pty) Limited) at 150° C. in a slurry reactor. The slurry reactor was closed and pressurised with an inert gas, namely Argon, to 1.8 MPa. The temperature of the reactor was increased to 240° C. and at that temperature, syngas (H$_2$:CO=1.5) was passed through the reactor at a GHSV of 5300 ml(N)/g cat/h and maintained for 16 hours. A fresh feed and tail gas GC analysis was done using a ~10% Ar flow in the feedgas as internal standard and used to calculate rates and conversions.

After this activation/reduction period the temperature was increased to 260° C. and the reactor pressure increased to 2.35 MPa. The syngas ratio of the fresh feed was changed to 0.83 (H$_2$:CO) and fed to the reactor at a GHSV of 2000 ml(N)/g cat/h. These conditions gave a FT and WGS rate that was substantially similar to that of the process described in example 1. The usage ratio was also 0.86. The methane selectivity increased to around 4%. The total acid production (water and the oil fraction) however was twice that of example 1 at around 1.8×10$^{-3}$ (mole COOH/mole CO→FT products).

Example 3

This example will show the negative effects of a catalyst with a different composition as well as different activation procedure than that specified above. The composition, prepared as in Example 1, is as follows:

| | |
|---|---|
| Fe | 61 mass % |
| Cu | 2.7 g/100 g Fe |
| K2O | 2.4 g/100 g Fe |
| SiO2 | 4.8 g/100 g Fe |

15 gram of this catalyst was added to 350 g of commercially produced H1 (commercially produced by Sasol Wax South Africa (Pty) Limited) wax at 150° C. in a slurry reactor. The slurry reactor was closed and pressurised with an inert gas, namely Argon, to 1.17 MPa. The temperature of the reactor was increased to 270° C. and at that temperature, CO was passed through the reactor at a GHSV of 1500 ml(n)/g cat/h and maintained for 24 hours. A fresh feed and tail gas GC analysis was done using a ~10% Ar flow in the feedgas as internal standard and used to calculate rates and conversions.

After this activation/reduction period the temperature was changed to 230° C. and the reactor pressure unchanged at 1.3 MPa. The syngas ratio of the fresh feed was changed to 0.7 (H$_2$:CO) and fed to the reactor at a GHSV of 3500. These conditions gave a comparable FT and WGS rate and resulted in a usage ratio similar to the feedgas ratio as set out in example 1. The methane selectivity stabilised at around 3%. The acid production (only determined for the water fraction) however was more than five times that of example 1 at around 4.5×10$^{-3}$ (mole COOH/mole CO→FT products).

From the examples it is clear that operating a catalyst under the known process conditions to cope with a feed syngas ratio below 1 (usage ratio similar to feed ratio) the acid production is very high (example 2 and 3) and a clear advantage is shown in example 1, where, as a result of subjecting the catalyst under conditions according to the invention a clear and definite drop in acid selectivity can be achieved while operating the process with a feed syngas ratio lower than 1 (usage ratio similar to feed ratio).

The invention claimed is:

1. A three-phase low temperature Fischer Tropsch (LTFT) process comprising converting a feed of $H_2$ and CO to hydrocarbons and possible oxygenates thereof by contacting the $H_2$ and CO in the presence of an iron-based Fischer Tropsch catalyst in a reaction zone, wherein the molar ratio of $H_2$:CO in the feed is from 0.5 and less than 1.0 and wherein the iron-based Fischer Tropsch catalyst is activated according to the steps of:
   (a) providing an iron-based catalyst including iron in a positive oxidation state; and
   (b) contacting the iron-based catalyst in a reactor with a reducing gas selected from CO and a combination of $H_2$ and CO at a $H_2$:CO molar ratio of from 100:1 to 1:100; at a reduction temperature of at least 245° C. and below 280° C.; at a reducing gas pressure of above 0.5 MPa and not more than 2.2 MPa; and at a GHSV of total reducing gas fed to the reactor of at least 6000 ml(N)/g cat/h, thereby reducing the iron that is in a positive oxidation state in the catalyst.

2. The process of claim 1, wherein less than $1.0 \times 10^{-3}$ mole of COOH per mole of CO converted to hydrocarbons and possible oxygenates thereof is formed.

3. The process of claim 1, wherein the iron based catalyst includes one or more promoters selected from the group consisting of a source of alkali metal, a source of an alkaline earth metal, a source of Cu and a source of Si.

4. The process of claim 3, wherein the iron based catalyst includes between 0.5 to 8 g of Cu per 100 g of Fe.

5. The process of claim 1, wherein the reducing gas comprises a mixture of $H_2$ and CO, the ratio of $H_2$:CO in the reducing gas being from 5:1 to 1:5.

6. The process of claim 1, wherein the reduction temperature is from 250° C. to 265° C.

7. The process of claim 1, wherein the GHSV of the reducing gas is at least 10 000 ml(N)/g cat/h.

8. The process of claim 1, wherein the ratio of $H_2$:CO in the feed is from 0.60 to 0.85.

9. The process of claim 1, wherein the conversion of $H_2$ and CO in the feed is carried out at a temperature of from 150° C. to 300° C.

10. The process of claim 1, wherein the conversion of $H_2$ and CO in the feed is carried out at a pressure of from atmospheric pressure to 3.5 MPa.

11. The process of claim 1, wherein the GHSV of the feed of $H_2$ and CO is between 100 to 30,000 ml(n)/g cat/h.

12. The process of claim 9, wherein the GHSV of the feed of $H_2$ and CO is at least 1000 ml(n)/g cat/h to 8000 ml(n)/g cat/h.

* * * * *